Dec. 3, 1968   M. FORTIN   3,414,137
REMOTE HANDLING DEVICE
Filed June 6, 1966   3 Sheets-Sheet 1

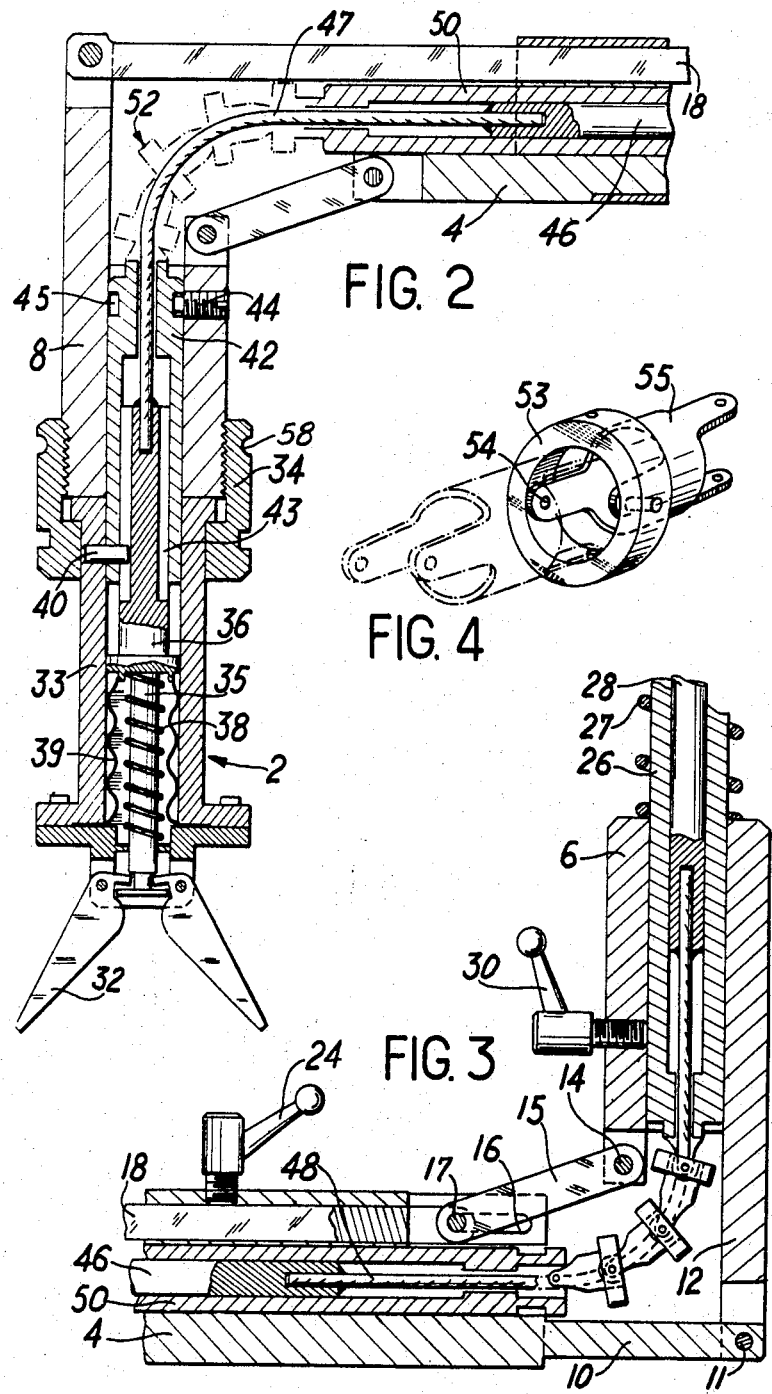

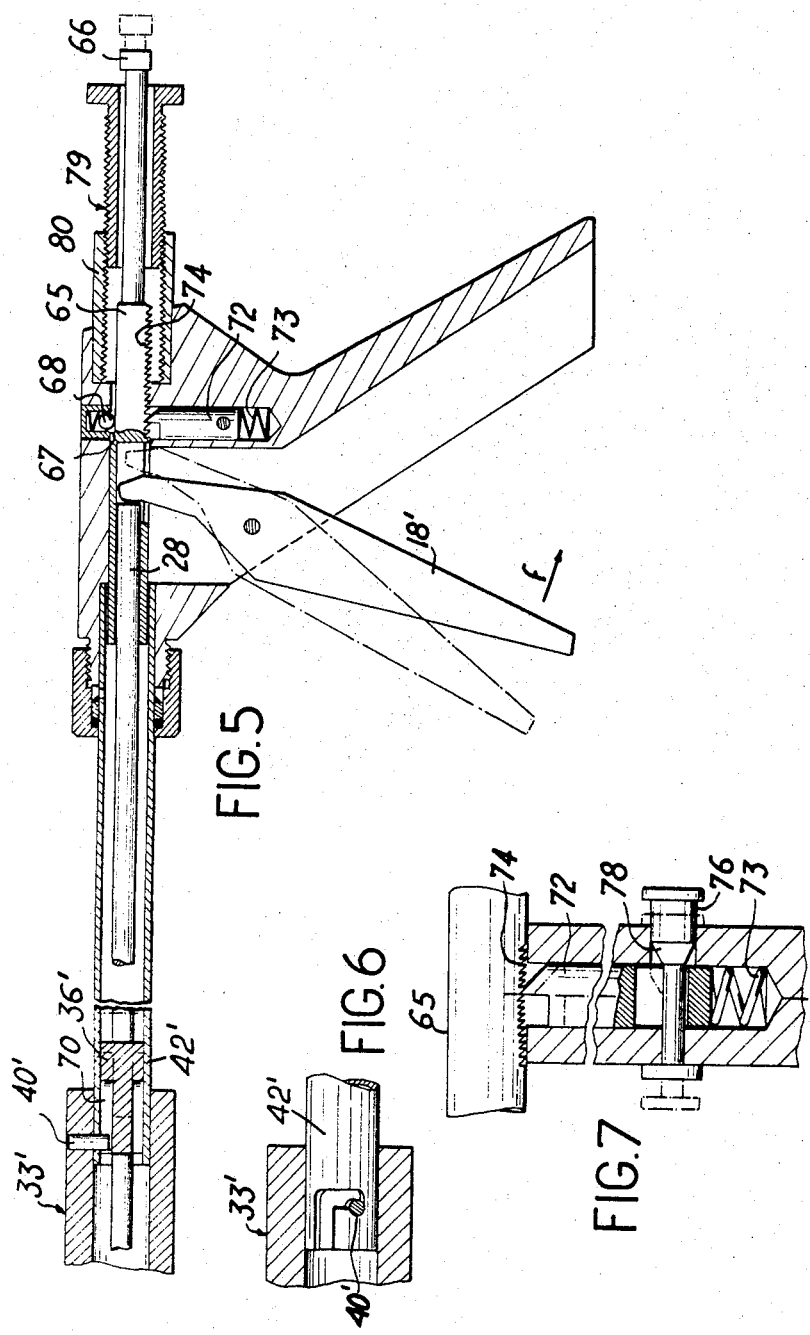

United States Patent Office 3,414,137
Patented Dec. 3, 1968

3,414,137
REMOTE HANDLING DEVICE
Marcel Fortin, Le Chesnay, France, assignor to Commissariat à l'Energie Atomique, Paris, France
Filed June 6, 1966, Ser. No. 555,563
Claims priority, application France, June 11, 1965, 20,455; Oct. 15, 1965, 35,206
6 Claims. (Cl. 214—1)

ABSTRACT OF THE DISCLOSURE

A remote controlled grab for use in a nuclear reactor has a control connected to the grab through a tubular member. The control has a sliding member mounted in a rotatable transmission member. The grab has a similar sliding member and rotatable transmission member. The sliding members are connected by flexible rods acting through the tubular member. A rotatable sleeve is mounted in the tubular member and is connected to the transmission members by serially connected universal joints. The tubular member is articulated to the control and to the grab.

---

The present invention is directed to a remote handling device. Although the applications of this device are in no way limited to the nuclear engineering field, it may be employed in particular for the purpose of manipulating radioactive objects, whether such objects are located, for example within the tank of a swimming-pool reactor or within a leak-tight chamber, in which case the manipulating operation is performed through a shield wall.

The devices which have been employed for this purpose up to the present time generally comprise a mechanical transmission system of more or less substantial length which serves to connect a control mechanism to a controlled unit such as, for example a grab for the purpose of gripping objects.

The present invention is directed to the design concept of a device of this type which makes it possible by producing action on the control mechanism alone to incline the handling grab with respect to the transmission systems. A further object of the invention is to make it possible, by means of the same device, to produce a movement of rotation of the grab about its axis and to effect the opening or closing of said grab by means of a translational movement of a push-rod.

The devices of the prior art which are designed for similar purposes are usually provided either with long transmission cables and guide pulleys or with pinions. In the first case, variations in the length of the cables give rise to faulty transmission; and untimely opening of the grab not infrequently results from a movement of rotation which is imparted thereto. Furthermore, the lack of precision of such transmission systems precludes the possibility of manipulating small and fragile objects by means of handling devices of this type which have a further disadvantage in that they are highly cumbersome. So far as the pinions are concerned, they cannot be employed in machines of small size which are capable of lifting heavy loads since the strength of the gears would in that case be inadequate.

The present invention proposes a remote handling device which meets practical requirements more effectively than the solutions of the prior art and which offers in particular the following advantages: it ensures highly accurate operation, permits of any displacement of the grab without untimely opening and nevertheless remains extremely simple both in design and operation as well as being of small overall size. In addition, leak-tightness through a wall can readily be ensured.

The handling device according to the invention comprises rigid transmission members which are coupled by means of flexible connections to a control mechanism and to a controlled unit and which are located inside an articulated frame comprising a sleeve for supporting said control mechanism, a sleeve for supporting said controlled unit and two sliding members which are adapted to slide with respect to each other in parallel relation with said rigid transmission members, and is characterized in that each of said sliding members is pivotally coupled to one of said sleeves and coupled to the other sleeve by means of a link-arm.

This handling unit is so designed that the length of the transmission system constituted by the rigid transmission members and the flexible connections is not substantially modified during deformations of the articulated frame, thereby permitting of highly accurate operation.

According to a preferred mode of construction of the invention, the handling device comprises a system for producing the rotational movement of said controlled unit such as a handling grab, the different elements of which are respectively disposed coaxially with the different elements of a system for producing translational movement and especially a system for producing opening and closing movements of the grab.

The system for producing rotational movement of the grab preferably comprises a tubular member which is adapted to move freely both in rotation and in translation inside the frame and which is coupled by means of a plurality of serially-connected universal joints on the one hand to rotary drive means which are slidably mounted in the support sleeve of the control mechanism and on the other hand to the body of the controlled unit which is rotatably mounted in the corresponding support sleeve.

The opening of the grab can, in particular be carried out by means of a push-rod which is applied against an operating pin which is returned to the closed position by flexible means.

One particular mode of application of the invention which is chosen by way of non-limitative example is described hereinafter. Reference is had in the following description to the accompanying drawings, in which:

FIG. 2 is a more detailed sectional view of the handling grab and of the coupling means provided between said grab and the transmission members;

FIG. 3 is a sectional view of the coupling means provided between the control mechanism and the transmission members;

FIG. 4 illustrates the universal joint systems employed;

FIG. 5 shows another embodiment of the control handle and a portion of the grab, this view being taken in cross-section along the central plane of said handle and grab;

FIG. 6 is a detail view of a part of FIG. 5 showing a bayonet-type coupling between the handling grab and its support sleeve;

FIG. 7 is a detail view on a large scale of a part of FIG. 5 showing a device for locking the grab-opening control system.

Figures 1A, 1B:
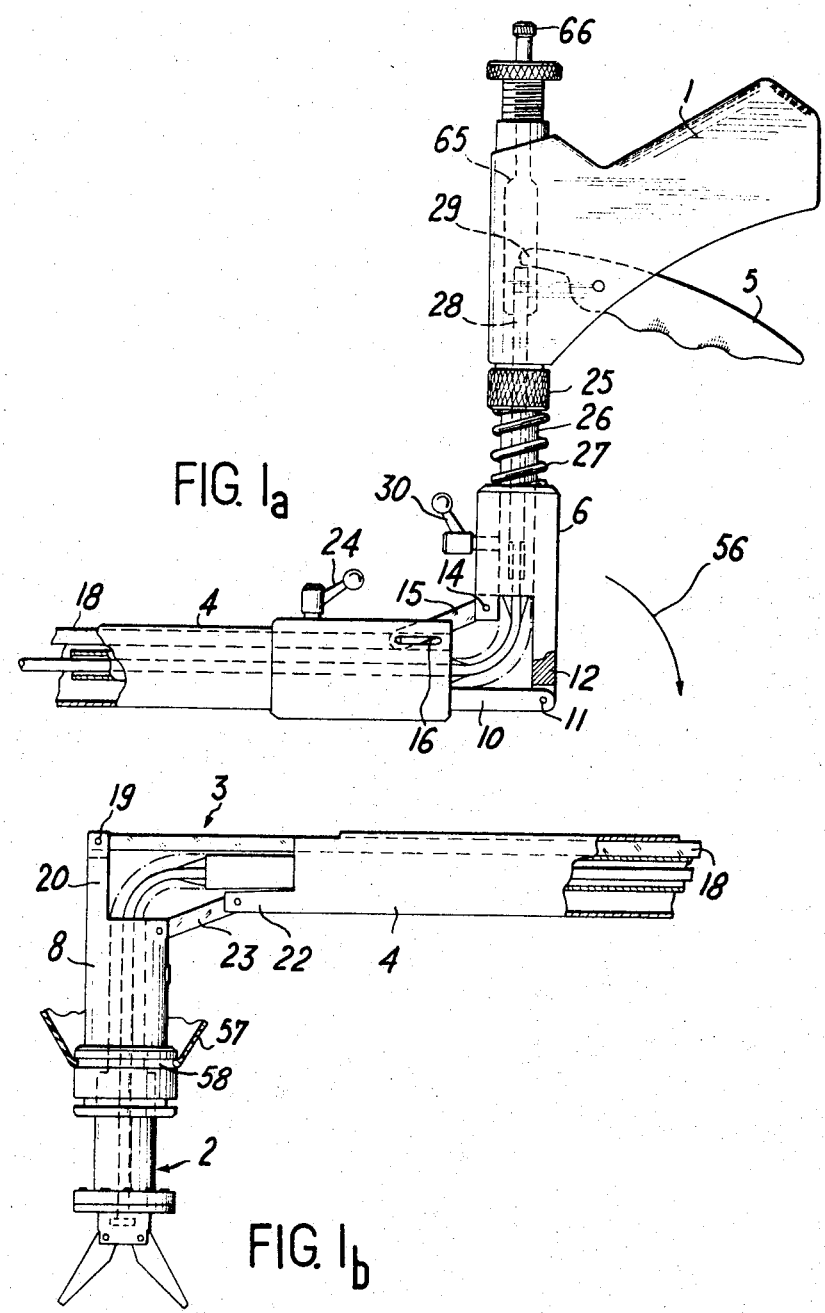
FIG. 1 is a general view of the handling device, namely the control mechanism which is shown more specifically in FIG. 1a and the controlled unit constituted by a handling grab which is shown more specifically in FIG. 1b.

The device as herein described and illustrated in its main principles in FIG. 1 (a and b) is essentially made up of a control handle 1, a grab 2 which is designed to grip objects to be manipulated, and an articulated frame 3 through which are passed the members for transmitting commands from the handle 1 to the grab 2.

As will become apparent hereinafter, the assembly makes it possible to effect:

The opening and closing of the grab 2 by operating the trigger 5;

The movement of rotation of the grab 2 about its axis by rotating the handle 1;

The inclination of the grab 2 with respect to the tubular body 4 of the frame 3 symmetrically with the control handle 1.

The tubular body 4 of the frame can be made up of a number of assembled elements in order to obtain the desired length according to the applications which are contemplated. The frame 3 additionally comprises two sleeves 6 and 8 which are pivotally coupled respectively to each end of the tubular body 4 and which carry respectively the control handle 1 and the grab 2, said handle and grab being rotatably mounted with respect to said sleeves.

In the particular case which is described, the sleeves 6 and 8 are disposed symmetrically with respect to the center of the tubular body 4. Said body is provided with an extension 10 which is pivotally coupled at 11 to an extension 12 of the sleeve 6. Said sleeve 6 is in turn pivotally coupled at 14 to a link-arm 15, the other end of which is pivoted on the link 18 by pivot pin 17. The pivot-pin 17 is adapted to slide within an elongated guide slot 16 which is formed in the tubular body 4. The link 18 is adapted to slide inside the tubular body 4 and the opposite end thereof is pivotally coupled at 19 to an extension 20 of the sleeve 8. The sleeve 8 is also coupled with an extension 22 of the tubular body 4 by means of a link-arm 23 which is pivoted at both ends. A locking key 24 serves to immobilize the link 18 with respect to the tubular body 4.

The control handle 1 is fixed by means of an internally threaded ring 25, said ring being screwed onto a tubular end-piece 26 which is slidably fitted within the sleeve 6. The ring 25 can be fitted if necessary with sealing joints which have not been shown in the drawings. An equalizing spring 27 permits the longitudinal displacement of the control handle 1 with respect to the sleeve 6.

There is fitted within the tubular end-piece 26 a rod 28 against the end of which is applied the nose 29 of the trigger 5 which is pivotally mounted on the control handle 1, with the result that the rod 28 is driven back inside the sleeve 6 by pulling said trigger to the rear. The rod 28 is provided with an extension 65 which projects to the rear of the control handle and terminates in an operating knob 66. The extension 65 and consequently the rod 28 are secured against rotation by the trigger 5. The transmission of the control operation which produces the opening of the grab 2 through the intermediary of the rod 28 as well as the function of the operating knob 66 will be explained in detail hereinafter. A ratchet system (pawl 72, FIG. 5) serves to lock the trigger 5 and the rod 28 in the desired position so as to prevent untimely opening or closing of the grab. A locking key 30 is additionally provided for the purpose of immobilizing the tubular end-piece 26 with respect to the sleeve 6.

The handling grab 2 is shown in greater detail in FIG. 2 and comprises two jaws 32 which are pivotally attached to the grab body 33. Said grab body is coupled to the sleeve 8 by means of an internally threaded ring 34 but nevertheless remains freely rotatable with respect to the sleeve 8, leak-tightness being ensured if necessary by means of sealing joints which are not shown in the figure.

The opening and closing movements of the jaws 32 are controlled by translational motion of an operating pin 35 which is in turn thrust forward by a cylindrical end-piece 36, the displacement of which within the sleeve 8 is controlled by the trigger 5 and the rod 28 as will be described hereinafter. The operating pin 35 is restored to the closed position by a spring 38, one end of which is applied against the extremity of the pin 35 and the other end of which is applied against the grab body. A bellows seal 39 ensures imperviousness of the interior of the grab body to the outside atmosphere.

The grab body 33 is rigidly fixed to a tubular end-piece 42 which is rotatably mounted in the sleeve 8 and coupled, as will be explained hereinafter, to the tubular end-piece 26 which is rigidly fixed to the control handle 1. The tubular end-piece 42 and grab body 33 are interconnected by means of a bayonet-type mechanism which is shown in FIG. 6: the grab body 33 is accordingly provided with studs 40 which are adapted to engage in recesses of corresponding shape formed in the tubular end-piece 42. This mechanism makes it possible to disassemble the grab after having unscrewed the ring 34.

The stud 40 which penetrates into a longitudinal groove 43 of the end-piece 36 prevents any rotational movement of this latter while at the same time permitting of its longitudinal sliding motion. Finally, a screw 44 penetrates into a circular groove 45 which is formed in the tubular end-piece 42 and thus prevents this latter from sliding within the sleeve 8 while nevertheless permitting of its rotational motion.

As shown in FIGS. 2 and 3, the grab-operating end-piece 36 is coupled to the rod 28 which is controlled by the trigger 5 by means of a push-rod 46 which ensures the transmission of motion through the tubular body 4 and by means of two flexible rods 47 and 48 which are located at the level of the articulations of the frame 3. The aforesaid rods are welded respectively, in the case of the rod 47, to one extremity of the end-piece 36 and one extremity of the push-rod 46 and, in the case of the flexible rod 48, to one extremity of the tubular end-piece 46 and one extremity of the rod 28. This assembly thus ensures the transmission of the grab-opening control operation.

The push-rod 46 is slidably fitted inside a tube 50 which is in turn adapted to slide within the tubular body 4 and which accordingly effects the transmission of rotational movements from the tubular end-piece 26 which is rigidly fixed to the control handle 1 up to the tubular end-piece 42 which is rigidly fixed to the grab body 33. At the level of each articulation of the frame 3 (as shown in FIG. 2 and 3), the flexible transmission is ensured by means of four hollow universal joints such as 52 which are connected together in series.

One of the aforesaid universal joints is shown on a larger scale in FIG. 4 and comprises an outer ring 53 which is fitted internally with four small pivot-pins 54 disposed crosswise (at right angles to each other). A hollow cylinder 55 is pivotally mounted on two of these diametrically opposite pins and is in turn pivotally attached at two points at right angles to these latter to the outer ring of the following universal joint. These hollow joints provide an internal passageway for the flexible rod 47 (or 48) which also serves as a guide for said joints. The two hollow end cylinders of the series of universal joints of FIG. 2 are coupled to the end-piece 42 and to the tube 50 respectively and the two hollow end cylinders of the series of FIG. 3 are coupled to the tube 50 and to the end-piece 26 respectively.

FIG. 5 shows certain details of construction of the control handle in conjunction with an alternative form of construction of the handling grab. The trigger 18' which is shown in full lines in its normal rest position is applied against the end of the rod 28 and serves to operate this latter. The rest position referred to is determined by an elastic stop constituted, for example, by an annular shoulder 67 which is formed on the extension 65 and which is applied against a spring-loaded ball 68. The grab-restoring spring 38 (shown in FIG. 2) thrusts back the rod 28 towards the rest position with a force which is insufficient to overcome the resistance of the elastic stop. When the rod 28 is in its rest position or in a more advanced position which corresponds to the grab-opening control, the grooves 70 of the end-piece 36' lock the stud 40' against rotation and thus prevent uncoupling of said end-piece while keying this latter so as to permit of sliding motion only. When a tractive effort is exerted on the terminal knob 66 so as to move both the trigger 18', the rod 28 and the end-piece 36' to the rear in the position in which they are shown in chain-dotted lines in FIG. 5, the passage of the stud 40' is freed. This permits the interassembly of the sleeve 8 and grab 2 by means of the bayonet-type coupling system while the knob 66 is maintained in the rearward position. Then, as soon as the trigger 18' is pulled back in the direction of the arrow $f$, the members 28 and 36' will return to the rest position thereof or beyond this position and the ball 68 moves back to its locking position, thereby preventing any accidental uncoupling.

In order to permit the manipulation of objects without making it necessary for the operator to exert continuous pressure on the trigger 5, provision is made for a releasable ratchet system as previously mentioned and consisting of a pawl 72 urged by a spring 73 into engagement with a set of teeth 74 which is carried by the extension 65. Releasing or uncocking of the ratchet system is carried out by actuating a release push-rod 76 (as shown in FIG. 7). Said push-rod 76 has a frusto-conical portion 78 followed by a cylindrical portion of large diameter; thus, the push-rod can be brought from its rest position (shown in full lines in FIG. 7) to its position of maximum penetration (shown in chain-dotted lines) in which it can be left in order to maintain the ratchet system in the uncocked position. However, the ratchet system cannot ensure absolute safety against accidental release of the rod. In point of fact, the grab can accidentally open if pressure is applied on the push-rod 76 as a result of an error of operation. In order to avoid this danger, the mechanism comprises a locking member consisting of an externally threaded sleeve 79 (as shown in FIG. 5) which can be screwed into an internally threaded bushing 80, said bushing being rigidly fixed to the handle. The sleeve 79 is brought into contact by screwing with an annular shoulder which is provided for this purpose on the extension 65 and serves to force back the extension and the rod 28 into a position corresponding to the closure of the grab which is therefore locked in that position and cannot be accidentally released.

The handling device herein described is employed in the following manner:

If the handle 1 is displaced either in one direction or in the other in the direction of the arrows 56 (as shown in FIG. 1) while maintaining the tubular body 4 motionless, the lever 18 is caused to slide within the tubular body 4 and the grab 2 is inclined at an angle. In the particular case described, the variations in the angle of inclination both of the handle and of the grab are symmetrical with respect to one point, namely to the center of the tubular body 4. However, the invention is not limited in any sense to this particular case and it would be possible, for example, to obtain a parallel displacement of the grab and of the handle if the link 18 were pivotally coupled directly to the sleeves 6 and 8, in which case both the said sleeves are connected to the tubular body 4 by means of link-arms.

The variations of inclination of the grab 2 with respect to the body 4 are thus controlled without either cables or pinions, by means of articulation points located externally to the axes of the different parts of the frame 3. The members which serve to transmit the grab-rotating and grab-opening movements can accordingly be located in the immediate vicinity of said axes.

The movement of rotation of the handle 1 about the axis of the sleeve 6 makes it possible to rotate the grab 2 about its axis independently of the movement previously effected. The possibility of rotation is infinite either in one direction or in the other, by virtue of the transmission provided through the universal joints 52. This rotation does not produce any variation in the relative positions of the grab jaws, especially by virtue of the fact that the rods 47 and 48 for the transmission of the grab-opening movement rotate simultaneously.

Finally, the opening of the grab is initiated by the trigger 5 which thrusts forward the operating pin 35 in opposition to the spring 38.

The device hereinabove described thus affords a high degree of safety and high operating precision. It can be employed in particular for the manipulation of hazardous objects contained in a leak-tight chamber. A bellows seal 57 can in that case be employed for the purpose of ensuring leak-tightness with the chamber wall; the ring 34 is provided for this purpose with a groove 58 which is intended to accommodate the beaded edge of the bellows seal. In the case of this application, the device has the advantage of small overall size inasmuch as the complete assembly of transmission members is contained within a cylindrical volume when the sleeves 6 and 8 are located in the line of extension of the tubular body 4: the device can in that case readily be withdrawn through the wall of the leak-tight chamber after the grab has first been disconnected.

It will naturally be understood that the invention is not limited in any respect to the examples which have been described in the foregoing by way of indication. On the contrary, the invention extends to all alternative forms. In particular, the control mechanism could be operated in dependence on an electric, hydraulic or pneumatic system.

What is claimed is:

1. A remote handling device comprising a tubular body, a control mechanism, a controlled unit, a rigid transmission member for said control mechanism, a rigid transmission member for said controlled unit, a sleeve supporting said control mechanism mounted for articulation on said tubular body, a sleeve supporting said controlled unit mounted for articulation on said tubular body, two sliding members sliding in parallel relation, each of said sliding members being mounted in a respective one of said rigid transmission members, flexible connections between said sliding members, means for producing rotational movement of said control unit secured to said first name transmission member including a tubular member moving freely in rotation and in translation inside said tubular body, a plurality of serially connected universal joints coupling said tubular member to said first named rigid transmission member, said first name rigid transmission member being rotatably mounted in said first named sleeve and a plurality of serially connected universal joint coupling said tubular member to said second named transmission member, said control unit being rotatably mounted in its support sleeve.

2. A device as described in claim 1 including a link slidably mounted in said tubular body, said link being pivotally coupled to one of said sleeves and coupled to the other of said sleeves by a link-arm, said tubular body being pivotally coupled to one of said sleeves and coupled to the other of said sleeves by a link-arm, said link-arms being located at opposite extremities of said link and said body.

3. Device as described in claim 1, said sliding members being coaxial with and sliding in their respective one of said rigid transmission members.

4. Device as described in claim 1, said controlled unit being a handling grab, the movement of said sliding members opening and closing said grab.

5. A device as described in claim 1 including a grab body, a locking pin mounted in said grab body and extending through the adjacent one of said rigid transmission members, said grab body and said rigid transmission member being locked together and unlocked by relative rotational motion of said grab body and said rigid transmission member, a groove in the adjacent one of said sliding members receiving said pin for sliding motion of said sliding member, and a retractable stop on said control mechanism limiting the displacement of said sliding members.

6. A device as described in claim 5, said stop exerting a locking force which is greater than the force exerted by a return spring for said sliding members.

References Cited

UNITED STATES PATENTS 2,765,930  10/1956  Greer.
3,065,864  11/1962  Coffman.

GERALD M. FORLENZA, *Primary Examiner.*

GEORGE F. ABRAHAM, *Assistant Examiner.*